United States Patent
Arendt et al.

(10) Patent No.: US 8,207,253 B2
(45) Date of Patent: Jun. 26, 2012

(54) MIXED ARYL/ALKYL DIESTER COMPOSITIONS

(75) Inventors: William D. Arendt, Libertyville, IL (US); Makarand Joshi, Grayslake, IL (US)

(73) Assignee: Eastman Specialties Holdings Corporation, Kingsport, TN (US)

( * ) Notice: Subject to any disclaimer, the term of this patent is extended or adjusted under 35 U.S.C. 154(b) by 604 days.

(21) Appl. No.: 11/855,319

(22) Filed: Sep. 14, 2007

(65) Prior Publication Data

US 2009/0075106 A1  Mar. 19, 2009

(51) Int. Cl.
- *B32B 17/00* (2006.01)
- *C08K 5/00* (2006.01)
- *C08K 5/09* (2006.01)
- *C08K 5/12* (2006.01)
- *C08K 5/10* (2006.01)
- *G02F 1/361* (2006.01)
- *A61L 15/62* (2006.01)

(52) U.S. Cl. ........ 524/306; 524/290; 524/292; 524/293; 524/299; 524/308

(58) Field of Classification Search ........... 524/290, 524/306, 292, 293, 299, 308
See application file for complete search history.

(56) References Cited

U.S. PATENT DOCUMENTS

| | | |
|---|---|---|
| 4,545,784 A | 10/1985 | Sanderson |
| 5,442,001 A | 8/1995 | Jones et al. |
| 5,972,375 A | 10/1999 | Truter et al. |
| 6,495,626 B1 * | 12/2002 | Overend et al. ............... 524/515 |
| 6,875,491 B2 | 4/2005 | Miyamoto et al. |
| 6,933,337 B2 | 8/2005 | Lang et al. |
| 7,241,825 B2 | 7/2007 | Koga et al. |
| 2003/0050372 A1 * | 3/2003 | Stanhope et al. ............. 524/291 |
| 2003/0092808 A1 * | 5/2003 | Stanhope et al. ............. 524/291 |

OTHER PUBLICATIONS

Related International Patent Application No. PCT/US08/76016, Search Report dated Nov. 25, 2008; 2 pgs.

* cited by examiner

*Primary Examiner* — Mark Eashoo
*Assistant Examiner* — Angela C Scott
(74) *Attorney, Agent, or Firm* — Brett L. Nelson

(57) ABSTRACT

Novel ester compositions are prepared by reacting 1) at least one diol, glycol or oligomeric glycol with 2) a mixture of at least one aromatic monocarboxylic acid and at least one aliphatic monocarboxylic acid containing from 2 to 4 carbon atoms. The compositions are effective plasticizers for a variety of polymers, particularly those employed in water-borne adhesives. The freezing point of the present ester mixtures and their efficacy as plasticizers and other types of additives and/or modifiers for a variety of polymer compositions can be varied by adjusting the relative concentrations of the aromatic and aliphatic acids used to prepare the ester composition.

9 Claims, No Drawings

MIXED ARYL/ALKYL DIESTER COMPOSITIONS

BACKGROUND OF THE INVENTION

1. Field of the Invention

This invention relates to novel and unique mixed alkyl/aryl diester compositions. More particularly, this invention relates to diester compositions derived from a) an aromatic monocarboxylic acid, b) at least one aliphatic monocarboxylic acid containing from 1 to 3 carbon atoms, and c) a linear or branched diol. The aromatic monocarboxylic acid is benzoic acid or a substituted benzoic acid. The monoesters of either or both of the monocarboxylic acids can also be present.

Preferred ester mixtures are low viscosity liquids at 25° C.

The diester compositions of this invention can be used for many of the end-use applications typical for prior art benzoate esters, including but not limited to plasticizers, solvents, carriers and modifiers. The present ester compositions are particularly useful as plasticizers for aqueous adhesive compositions.

2. The Prior Art

U.S. Pat. No. 6,933,337, which issued to Jiamin Lang et al. on Aug. 21, 2005 describes ester compositions prepared by reacting a diol with a mixture of benzoic acid and an alkanoic acid containing from 4 to 22 carbon atoms and the use of these ester compositions as the plasticizer in vinyl chloride plastisols that are liquid at 25° C.

U.S. Pat. No. 5,442,001, which issued to M. E. Jones et al. on Aug. 15, 1995 lists a number of conventional plasticizers for waterborne adhesives. This list includes diethylene glycol dibenzoate, dipropylene glycol dibenzoate and the triethylene glycol polyester of benzoic acid and phthalic acid.

U.S. Pat. No. 5,972,375, which issued to Truter et al. on Oct. 26, 1999 discloses using low molecular weight polyethylene glycols, glycerine, ethylene glycol and propylene glycol as plasticizers for a water-insoluble hydrogel formed by the combination of polyvinyl alcohol and a second water-soluble polymer.

A pure form of ethylene glycol benzoate acetate is described as an activator for sodium perborate in U.S. Pat. No. 4,545,784 to W. R. Sanderson, issued on Oct. 8, 1985.

SUMMARY OF THE INVENTION

The ester compositions of this invention comprise:
a mixed diester corresponding to formula (I)

$R^1C(O)OR^2O(O)CR^3$;

from 20 to 100 weight percent, based on the weight of said mixed diester, of a diester corresponding to formula (II)

$R^1C(O)OR^2O(O)CR^1$;

from 0 to 40 weight percent, based on the weight of said mixed diester, of a diester corresponding to formula (III)

$R^3C(O)OR^2O(O)CR^3$;

and a total of from 0 to 30 weight percent, based on the total weight of said ester compositions, of at least one monoester corresponding to at least one formula selected from the group consisting of $R^1C(O)OR^2O(O)H$ and $R^3C(O)OR^2O(O)H$.

In all of the foregoing formulae $R^1$ is at least one radical selected from the group consisting of phenyl, alkyl-substituted phenyl and mixtures thereof, $R^2$ is at least one divalent radical of a formula selected from the group consisting of —$R^4$—, —$R^5(OR^5)_m$— and mixtures thereof, $R^3$ is at least one member selected from the group consisting of hydrogen and alkyl radicals containing from 1 to 2 carbon atoms, $R^4$ is at least one member selected from the group consisting of linear and branched alkylene radicals containing from 3 to 12 carbon atoms, $R^5$ is an alkylene radical containing from 2 to 6 carbon atoms, m represents at least one of the integers 1, 2 and 3 and the molar ratio of total $R^1$ radicals to total $R^3$ radicals is from 1:12 to 12:1.

The present diester compositions are derived from a) benzoic acid and/or a substituted benzoic acid, b) at least one monocarboxylic acid containing from 1 to 3 carbon atoms and c) at least one member from the group of diols, including glycols, containing from 2 to 12 carbon atoms and oligomers of glycols containing from 2 to 6 carbon atoms. These compositions can be used individually or in blends containing two or more of the compositions.

In preferred embodiments $R^4$ is in the foregoing general formulae is propylene, $R^5$ is ethylene, the molar ratio of $R^1C(O)$— to $R^3C(O)$— groups in said composition is at least 1:1, $R^1$ is phenyl, $R^3$ is methyl, and the composition is a liquid at 25° C.

Most preferably $R^4$ is propylene, the molar ratio of $R^1C(O)$— to $R^3C(O)$— groups in said composition is 1:1, and m is a combination of 1, 2 and 3.

A particularly preferred ester composition is prepared using a combination of 88 weight percent diethylene glycol, $HOCH_2CH_2OCH_2CH_2OH$ —, 10 weight percent triethylene glycol, $HOCH_2CH_2(OCH_2CH_2)_2OH$ and 2 weight percent tetraethylene glycol, $HOCH_2CH_2(OCH_2CH_2)_3OH$.

In the present ester compositions the diester derived from two moles of the aromatic acid and one mole of the diol or glycol can be present at a concentration of from 20 to 100 weight percent based on the weight of the mixed diester. The diester derived from two moles of aliphatic acid per mole of diol or glycol can be present at a concentration of from 0 to 40 weight percent based on the weight of the mixed diester. The present ester compositions can also contain from 0 to 30 weight percent, based on the mixed diester, of monoesters derived from the aromatic and/or the aliphatic monocarboxylic acid.

The present ester compositions are eminently suitable plasticizers for a variety of polymer compositions, including water-borne adhesives and organic plastisols. The ester compositions can also be used in both rigid and flexible polymer compositions for the additional purposes known for other classes of benzoic acids that are useful plasticizers. These additional uses include but are not limited to 1) modifiers other than plasticizers and 2) carriers for the various types of additives and modifiers known to those skilled in the art. The additives can be either functional or non-functional. Conventional functional additives for polymers include but are not limited to plasticizers, lubricants, solvents, and coalescents. Conventional functional additives for polymer-containing compositions include but are not limited to heat and light stabilizers, slip aids, anti-microbial agents, pigments, dyes, processing aids, peroxides, blowing agents, anti-static agents, and dye assists. Additives that are classified as "non-functional" include but are not limited to non-reactive liquid vehicles, fillers, and pesticides. A listing of the various classes of carriers, additives and modifiers for both polymers and compositions containing these polymers, also referred to as "plastics" is contained in a text entitled "Whittington's Dictionary of Plastics" by Lloyd Whittington, published by Technomic Publishing Company.

Waterborne adhesive compositions containing the present ester compositions exhibit advantages that include but are not limited to 1) a lowering of the glass transition temperature to a greater extent than has been achieved using other benzoic acid esters and 2) a desirable increase in the viscosity of the composition.

Substitution of a 1- to 3-carbon alkanoic acid such as acetic acid for a portion of the benzoic acid and/or higher alkanoic acids of prior art plasticizers results in greater polarity that allows use with more polar polymers such as those used in water-borne adhesives and in non-aqueous polymer compositions including but not limited to those containing polyvinyl chloride. This increase in utility with at most a minimal decrease in desirable properties of the plasticized composition can result in a substantial cost saving.

The ester compositions of this invention can be prepared by reacting at least one diol of the formula $HOR^2OH$ with 1) benzoic acid and/or an alkyl-substituted benzoic acid corresponding to the formula $R^1C(O)OH$ and 2) at least one aliphatic monocarboxylic acid of the formula $R^3C(O)OH$. The total moles of said aromatic and aliphatic carboxylic acids in the initial reaction mixture are equal to at least twice the number of moles of said diol and $R^1$, $R^2$ and $R^3$ are as hereinbefore defined.

The present ester compositions can contain 0 to about 30 percent by weight of monoesters of the diol $HOR^2OH$ and the aromatic and/or aliphatic monocarboxylic acids used to prepare the diester. These monoesters are represented in this specification by the formulae $R^1C(O)OR^2OH$ and $R^3C(O)OR^2OH$, wherein $R^1$, $R^2$ and $R^3$ are as previously defined. Preferred compositions contain 12 weight percent of the monoester and a total of 88 weight percent of the diesters.

This invention also provides polymer compositions containing an alkyl/aryl diester composition of the present invention as at least a portion of the plasticizer. In one embodiment the polymer composition is a water-borne adhesive. Typical polymers in these adhesives include but are not limited to polyvinyl acetate, copolymers of vinyl acetate with ethylene and with esters of acrylic and methacrylic acids and polyurethanes. Polyvinyl alcohol is sometimes used as a protective colloid.

The plasticizer can constitute from about 1 to about 50 weight percent, preferably from about 3 to about 25 weight percent of the adhesive composition.

An unexpected advantage of the present ester compositions is that by selecting preferred ranges for 1) the molar ratio of the aromatic monocarboxylic acid to the aliphatic monocarboxylic acid and 2) the number of carbon atoms in the aliphatic carboxylic acid and the diol, the physical properties such as melting point, viscosity and volatility exhibited by the resultant mixture of esters and the compatibility of these mixtures in adhesive compositions can be varied over a wide range to achieve a desired combination of properties.

Preferred ester compositions and the molar ratio of aromatic to aliphatic carboxylic acids used to prepare them are described in the accompanying examples.

In addition to aqueous adhesive compositions, the present esters can be used as plasticizers for a variety of rigid and flexible polymers, including but not limited to homopolymers and copolymers of vinyl acetate, vinyl chloride homopolymers and copolymers, acrylic polymers, polyesters, polyamides, polyurethanes, and epoxide polymers.

The present ester compositions, are also suitable for most of the end use applications disclosed for commercial benzoate composition available as Benzoflex® 9-88, 50 and 2088. These applications include but are not limited to use in plastisols and other applications of polyvinyl chloride, such as hot melt adhesives and as carriers for liquid and solid coloring agents, peroxides, textile dye assists, pesticides, and gasket swelling agents. The present ester compositions are also useful in a variety of polymer compositions including but not limited to latex caulks, sealants, elastomers, and a variety of coating-related applications, including but not limited to paints, industrial and commercial coatings and floor polishes.

In any of the foregoing end use applications the present ester compositions can be used alone, in blends with one another, or in combination with one or more of the known plasticizers.

Preparation of the Mixed Esters

The mixed ester compositions of this invention are preferably prepared by reacting the desired diol(s) and/or glycol(s) with the desired aliphatic carboxylic acid(s) or a suitable derivative of the acid such as the anhydride or an acid halide such as the chloride. The resultant half ester is then reacted with the aromatic carboxylic acid. The esters can also be prepared using ester interchange reactions.

While the molar ratio of the aromatic to the aliphatic carboxylic acid(s) used to prepare the initial reaction mixture is not critical with respect to operability of the process used to prepare the present compositions, this molar ratio is preferably 1:1. The aromatic carboxylic acid is preferably benzoic acid and the aliphatic carboxylic acid is preferably acetic acid.

Diols suitable for use in preparing the ester compositions of the present invention can be represented by the general formulae $HOR^4OH$ and $HOR^5(OR^5)_mOH$. In this formula $R^4$ represents at least one alkylene radical containing from 3 to 12 carbon atoms, $R^5$ represents at least one alkylene radical containing from 2 to 6 carbon atoms, and $\underline{m}$ represents at least one of the integers 1 and 2.

Preferred diols and glycols include but are not limited to propylene glycol, 2-methyl-1,3-propanediol, diethylene glycol, dipropylene glycol, triethylene glycol, tetraethylene glycol, tetraproplyene glycol, 1,3-butanediol, 1,4-butanediol and 2,2,4-trimethyl-1,4-pentanediol. Diols and glycols wherein $R^5$ is ethyl or propyl and m is 1 or 2 are particularly preferred based on their cost and commercial availability.

Because esterification is typically a reversible reaction, this reaction is typically conducted at a sufficiently high temperature that the water produced as a by-product of the reaction can be distilled from the reaction mixture and collected. To increase the rate of the esterification reaction, it is preferably conducted in the presence of a suitable catalyst such as mineral acids, alkali metal salts of said acids, organotin compounds, organotitanium compounds, zirconium compounds, organic sulfonic acids such as toluene sulfonic acid, anhydrous sodium acetate, tetrabutyl titanate and zirconium carbonate. These or any of the other known esterification catalysts can be used alone or in combinations of two or more.

The procedures and equipment used to prepare, isolate and analyze the ester mixtures produced from the esterification reaction are sufficiently well known to those skilled in this art that a detailed discussion is not required as part of the present specification. Gas chromatography is a preferred method for determining the types and relative concentrations of the esters in the present compositions.

In a preferred embodiment of the process used to prepare the present ester mixtures, the total moles of aromatic and aliphatic acids used to prepare the esters should be equal to twice the number of moles of diol.

Performance of the Present Mixed Esters as Plasticizers

Mixed esters prepared from benzoic acid and acetic acid with a glycol such as diethylene and dipropylene glycols are particularly useful plasticizers for water-borne adhesives based on their unique combination of an unexpectedly low freezing point and glass transition temperature. As an example, the freezing point of the diethylene glycol acetate/ benzoate mixed diester is <−11° C., compared with +18 to 20° C. for diethylene glycol diacetate and +28° C. for diethylene glycol dibenzoate.

As discussed in detail hereinbefore, the present mixed esters can be substituted for other benzoate and mixed alkyl/benzoate esters in any of the known end-use applications of these known esters. These applications include but are not limited to adhesives, caulks, paints, coatings, varnishes, inks, elastomers, self-supporting film-forming compositions and extrudable and moldable materials.

In addition to plasticizers the mixed ester compositions of the present invention are useful in other applications where esters of benzoic acid are typically employed. These applications include but are not limited to solvents, carriers for inert ingredients, coalescents, dye assists and property enhancers.

The following examples describe preferred embodiments of the present ester mixtures, a preferred method for preparing them, the physical properties of these mixtures and the properties exhibited by waterborne adhesive compositions containing these mixtures as plasticizers. The examples should not be interpreted as limiting the scope of the invention defined in the accompanying claims. Unless otherwise specified, all parts and percentages in the examples are by weight and the physical properties of the esters mixtures were measured at 25° C.

EXAMPLE 1

A mixed benzoate/acetate ester composition of the present invention based on diethylene glycol, and containing equimolar amounts of the two acids was prepared by charging a glass reactor with equimolar quantities of diethylene glycol ($HOCH_2CH_2OCH_2CH_2OH$), and acetic anhydride. Anhydrous sodium acetate in an amount equal to 0.13 mole was also added as an esterification catalyst.

The reactor was equipped with a thermometer to measure the temperature of the reaction mixture, a mechanically driven stirrer, an inlet for nitrogen extending below the surface of the reaction mixture, and a trap to collect the water formed as a by-product of the esterification reaction. A water-cooled reflux condenser was located above the trap to liquefy the water and other vaporized materials.

The contents of the reactor were heated for 2 hours at a temperature of between 130 and 140° C. The acetic acid produced as a by-product of the reaction was then removed by distillation at a temperature of 63° C. under a pressure of 38 to 50 mm Hg using a Vigreux column. The reaction mixture was then filtered to remove the sodium acetate, which was then washed using toluene, dried and then reintroduced into the reaction mixture together with an equimolar quantity of benzoic acid, based on the initially added diethylene glycol, and about 0.02 moles, on the same basis, of zirconium carbonate. The resultant mixture was then heated for 2 hours using the apparatus described in the first section of this example. During the reaction the theoretical amount of water was collected and the reaction mixture temperature increased to 207° C.

The liquid reaction product was recovered and washed first with aqueous sodium carbonate followed by a washing with an aqueous mixture of sodium carbonate and sodium hypochlorite and then dried. The yield of the final ester product was 81.3%.

Analysis of the reaction product using gas chromatography indicated the following product distribution: 48.7 weight percent diethylene glycol acetate benzoate (A), 40.7 weight percent diethylene glycol dibenzoate (84 percent of the mixed ester A) and 10.6 weight percent diethylene glycol diacetate (22 percent of mixed ester A).

The mixed acetate/benzoate ester of dipropylene glycol was prepared using the same procedure described in the preceding section of this example, but substituting dipropylene glycol for diethylene glycol.

EXAMPLE 2

This example demonstrates the utility of two mixed ester compositions of this invention, diethylene glycol benzoate acetate, referred to hereinafter as DEGBA, and dipropylene glycol benzoate acetate, referred to hereinafter as DPGBA, as plasticizers for aqueous adhesive compositions. DEGBA was evaluated in a composition containing a vinyl acetate/ethylene copolymer available as Airflex® 400H from Air Products Corporation. DPGBA was evaluated in a composition containing a vinyl acetate homopolymer available as Airflex® 400, a lower molecular weight version of Airflex® 400H, and a vinyl acetate homopolymer available as Vinac® XX-240 from the same supplier. Both the homopolymer and the copolymers contained polyvinyl alcohol as a protective colloid.

The two mixed esters were blended with the polymers at concentrations of 3, 6, and 12 weight percent using a Caframo® mixer rotating at a speed of 500 r.p.m. for 10 minutes, following which they were allowed to stand for 72 hours under ambient conditions before being evaluated.

The following evaluations were performed on each of the adhesive compositions: The glass transition temperature (Tg) of the compositions were measured by applying: six mil thick films of the adhesive to a glass substrate using a draw-down bar. The films were allowed to dry for 48 hours under ambient conditions. Samples were then cut from each of the films and their Tg determined using a model DSC 290 instrument manufactured by TA Instruments. The determinations were performed between temperatures of −60 to 105° C. using a heating rate of 10° C./minute. The temperature values at the onset of the phase transitions were recorded as the Tg.

Viscosity values were obtained 24 hours following blending of the polymer and plasticizer using a Brookfield type RVT viscometer equipped with an appropriate spindle rotating at 20 RPM.

Set times were determined by applying the adhesive being evaluated to the exposed surface of strips of 50 pound unbleached Kraft paper. A No. 16 Meyers rod was used to apply about a one millimeter-thick layer of the adhesive to strips of paper measuring 1½ inches (3.8 cm.) wide by 12 inches (30.5 cm.) long, following which an uncoated strip of the same paper measuring 1 inch (2.5 cm.) wide by 12 inches (30.5 cm.) long was centered over the coated strip and laminated to it using a No. 16 Meyers rod to press the two layers together. A timer was started immediately following application of the uncoated strip and the adhered strips were slowly separated. The time required to achieve 80 to 100% tearing of the component fibers across the width of the paper strip was considered the set time for the adhesive.

Open times were determined at a temperature of 23° C. and a relative humidity of 50% using the same type paper strips described for the set time determination. A No. 16 Meyer rod was used to apply the adhesive to the upper surface of the wider strip. With the layer of adhesive exposed, after a 5-second interval the narrower uncoated strip was placed over the lower strip. If bonding occurred, the open time was rated as 5 seconds. If bonding did not occur, this procedure was repeated using additional pairs of paper strips, with the exception that the time interval between coating of the wider strip and application of the uncoated upper strip was increased in 5-second increments. The procedure was repeated until a bond no longer formed between the upper and lower layers. The time interval between application of the adhesive and application of the upper paper strip at which the absence of bonding between the paper strips was observed is referred to as the "open time".

The data from the evaluation of diethylene glycol acetate benzoate using the Airflex® 400H polymer are recorded in Table 1.

TABLE 1

| % Plasticizer | Tg (° C.) | Open Time (s) | Set Time (s) | Viscosity (mPas) |
|---|---|---|---|---|
| 0 | −2 | 10 | 6 | 6000 |
| 3 | −9 | 10 | 4 | 7580 |
| 6 | −15 | 15 | 4 | 11180 |
| 12 | −28 | 15 | 5 | 25550 |

The data from the evaluation of dipropylene glycol acetate benzoate using Airflex® 400 and Vinac®XX-240 polymers are recorded in Table 2.

TABLE 2

| Polymer | % Plasticizer | Tg (° C.) (s) | Open Time (s) | Set Time | Viscosity (mPas) |
|---|---|---|---|---|---|
| Airflex ® 400 | 0 | 7 | 5 | 10 | 1900 |
| Airflex ® 400 | 3 | −2 | 10 | 17 | 4050 |
| Airflex ® 400 | 6 | −8 | 15 | 15 | 6630 |
| Airflex ® 400 | 12 | −18 | 20 | 14 | 20450 |
| Vinac ® XX240 | 0 | 46 | 3 | 18 | 3920 |
| Vinac ® XX240 | 6 | 19 | 5 | 16 | 4260 |
| Vinac ® XX240 | 12 | 3 | 15 | 15 | 6640 |
| Vinac ® XX240 | 18 | −9 | 15 | 16 | 11700 |

These data demonstrate a desirable decrease in the glass transition temperature together with the expected increase in the viscosity of the adhesive compositions.

That which is claimed is:

1. An aqueous adhesive composition comprising:
   A) a polymer selected from the group consisting of polyvinyl acetate, copolymers of vinyl acetate with at least one member selected from the group consisting of ethylene, esters of acrylic and methacrylic acids, and polyurethanes;
   B) from 1 to 50 weight percent, based on the weight of said polymer, of a plasticizer composition comprising
   1) a mixed diester corresponding to formula (I)

$R^1C(O)OR^2O(O)CR^3$;

2) from 20 to 100 weight percent, based on the weight of said mixed diester, of a diester corresponding to formula (II)

$R^1C(O)OR^2O(O)CR^1$;

3) from 0 to 40 weight percent, based on the weight of said mixed diester, of an ester corresponding to formula (III)

$R^3C(O)OR^2O(O)CR^3$; and a total of from 0 to 30 weight percent, based on the total weight of said ester composition, of at least one monoester corresponding to at least one formula selected from the group consisting of $R^1C(O)OR^2O(O)H$ and $R^3C(O)OR^2O(O)H$; and an aqueous solvent;

wherein $R^1$ is at least one radical selected from the group consisting of phenyl, alkyl-substituted phenyl, and mixtures thereof, $R^2$ is at least one divalent radical of a formula selected from the group consisting of $R^4$, $-R^5(OR^5)_m-$ and mixtures thereof, $R^3$ is at least one member selected from the group consisting of hydrogen and alkyl radicals containing from 1 to 2 carbon atoms, $R^4$ is selected from the group consisting of linear and branched alkyl radical containing from 3 to 12 carbon atoms, $R^5$ is an alkylene radical containing from 2 to 6 carbon atoms, m represents at least one of the integers 1 and 2 and the molar ratio of $R^1$ to $R^3$ radicals is from 1:12 to 12:1.

2. An aqueous adhesive composition according to claim 1 wherein the molar ratio of $R^1$ to $R^3$ radicals is at least 1:1, and said composition is a liquid at 25° C., and said plasticizer composition constitutes from 3 to 25 weight percent of said adhesive composition.

3. An aqueous adhesive composition according to claim 1 wherein said composition additionally contains at least one of said monoesters.

4. An aqueous adhesive composition according to claim 1 wherein $R^1$ is phenyl, m is 1 or 2 and $R^3$ is methyl.

5. An aqueous adhesive composition according to claim 4 wherein $R^4$ is propyl and $R^3$ is methyl.

6. An aqueous composition according to claim 5 wherein $R^2$ is the divalent radical $-R^5(OR^5)_m-$ and wherein in 88 percent of the radicals m is 1; in 10 percent of the radicals m is 2, and in 2 percent of the radicals m is 3.

7. An aqueous adhesive composition according to claim 6 wherein $R^5$ is ethylene.

8. A method for adhering two surfaces by applying a layer of the adhesive composition of claim 1 to at least one of said surfaces and then maintaining said surfaces in contact with one another for a period of time at least sufficient to form a cohesive bond between said surfaces.

9. A composite comprising at least two objects with adjacent mating surfaces that are cohesively bonded using the adhesive composition of claim 1.

* * * * *